United States Patent [19]
Koike et al.

[11] Patent Number: 5,916,971
[45] Date of Patent: Jun. 29, 1999

[54] GRADED-REFRACTIVE-INDEX OPTICAL PLASTIC MATERIAL AND METHOD FOR ITS PRODUCTION

[75] Inventors: Yasuhiro Koike; Hidenobu Murofushi; Norihide Sugiyama, all of Yokohama, Japan

[73] Assignee: Yasuhiro Koike, Yokohama, Japan

[21] Appl. No.: 08/659,365

[22] Filed: Jun. 6, 1996

[30] Foreign Application Priority Data

Jun. 9, 1995 [JP] Japan ................................. 7-143716

[51] Int. Cl.⁶ .................................................. C08G 65/48
[52] U.S. Cl. ........................................... 525/197; 525/199
[58] Field of Search ................................. 525/200, 197, 525/199

[56] References Cited

U.S. PATENT DOCUMENTS

| | | | |
|---|---|---|---|
| 4,252,859 | 2/1981 | Concannon et al. | 525/200 |
| 5,041,500 | 8/1991 | Ishiwari et al. | 525/200 |
| 5,051,479 | 9/1991 | Logothetis et al. | 525/200 |
| 5,179,167 | 1/1993 | Ishiwari et al. | 525/200 |

FOREIGN PATENT DOCUMENTS

| | | | |
|---|---|---|---|
| 0 208 159 | 1/1987 | European Pat. Off. | |
| 0 242 636 | 10/1987 | European Pat. Off. | |
| 0 459 132 | 12/1991 | European Pat. Off. | |
| 0 566 744 | 10/1993 | European Pat. Off. | |
| 0 606 598 | 7/1994 | European Pat. Off. | |
| 0 710 855 | 5/1996 | European Pat. Off. | |
| 63-122735 | 5/1988 | Japan | 525/200 |
| 3100039 | 4/1991 | Japan | 525/200 |

*Primary Examiner*—Bernard Lipman
*Assistant Examiner*—N. Sarofim
*Attorney, Agent, or Firm*—Oblon, Spivak, McClelland, Maier & Neustadt, P.C.

[57] ABSTRACT

A graded-refractive-index optical plastic material composed of an amorphous fluoropolymer (a) which has substantially no C—H bond and at least one material (b) which has substantially no C—H bond and differs from the fluoropolymer (a) in refractive index by at least 0.001, wherein the material (b) is distributed in the fluoropolymer (a) so as to have a concentration gradient in a specific direction, and the optical plastic material has a glass transition temperature which is substantially uniform throughout it.

22 Claims, 1 Drawing Sheet

FIGURE 1

GRADED-REFRACTIVE-INDEX OPTICAL PLASTIC MATERIAL AND METHOD FOR ITS PRODUCTION

The present invention relates to a graded-refractive-index optical plastic material (hereinafter sometimes referred to as optical plastic material for short) having high transparency, high heat resistance and reduced microvoids simultaneously, which conventional optical plastics hardly ever attained, and a method for its production.

The optical plastic material of the present invention may be a light transmission medium such as an optical fiber, or a body material of a light transmission medium such as a preform of an optical fiber.

A light transmission medium which is the optical plastic material of the present invention is free from light scattering and very transparent to light at wavelengths within a wide range from ultraviolet light to near infrared light, since it is made of an amorphous resin. Therefore, it is useful for optical systems for light of various wavelengths. In particular, the optical plastic material of the present invention provides a light transmission medium with small losses at wavelength of 1300 nm and 1550 nm, at which a trunk vitreous silica fiber is used in the field of optical communication.

A light transmission medium which is the optical plastic material of the present invention has heat resistance, chemical resistance, humidity resistance and nonflammability enough to withstand severe use conditions, for example, in an engine room of an automobile.

A light transmission medium which is the optical plastic material of the present invention is useful as various graded-refractive-index light transmission medium such as a graded-refractive-index optical fiber, a rod lens, an optical waveguide, an optical decoupler, a wavelength multiplexer, a wavelength demultiplexer, an optical attenuator, a light switch, an optical isolator, a light transmitting module, an light receiving module, a coupler, an optical deflector and an optical integrated circuit. Graded-refractive-index means a region wherein the refractive index of a light transmission medium varies continuously in a specific direction. For example, a graded-refractive-index optical fiber shows a refractive index profile that the refractive index parabolically decreases from the center of the fiber along the radii.

When the optical plastic material of the present invention is a body material of a light transmission medium, it is spun, for example, by hot drawing to prepare a light transmission medium such as a graded-refractive-index optical fiber.

Heretofore, as resins for graded-refractive-index plastic light transmission medium, optical plastics represented by methyl methacrylate resins, tetrafluoroethylene resins disclosed in WO94/04949 and vinyl fluoride resins have been proposed.

With respect to stepped-refractive-index plastic optical fibers, many proposals have been made to use optical plastics such as a methyl methacrylate resin, a styrene resin, a carbonate resin and a norbornene resin for a core and a fluoropolymer cladding. Japanese Unexamined Patent Publication No. 244007/1990 proposes use of a fluoropolymer core and a fluoropolymer cladding.

It is an object of the present invention to provide an optical plastic material having heat resistance, humidity resistance, chemical resistance and nonflammability required for applications to an automobile, an office automation (OA) equipment, an electrical appliance and the like, which light transmission medium made of a methyl methacrylate resin or a norbornene resin have never attained, and a method for its production.

A further object of the present invention is to provide a novel optical plastic material which is useful for ultraviolet light (wavelength from 200 nm to 400 nm) and near infrared light (wavelength from 700 nm to 2500 nm), which are unavailable to light transmission medium made of a methacrylate resin, a carbonate resin and a norbornene resin, and has low light transmission losses in a wide transmission zone and a method of its production.

Another object of the present invention is to provide an optical plastic material having low light transmission losses, having reduced microvoids which are formed by the difference in coefficient of thermal expansion between the center portion and the peripheral portion of a molded product during cooling after the molding and which used to be a cause for an increase of scattering losses in a conventional rod-in-tube molding method or a multilayer melt extrusion molding method for at least two layers employing materials having different glass transition temperatures for the core and the cladding, and a method for its production.

The present inventors have conducted extensive researches taking the above-mentioned problems into consideration, and consequently found that a fluoropolymer which has substantially no C—H bond is the most suitable to provide heat resistance, humidity resistance, chemical resistance and nonflammability and to eliminate C—H bonds (namely carbon—hydrogen bonds) which absorb near infrared light. The fluoropolymer has C—F bonds (namely carbon—fluorine bonds) instead of C—H bonds.

When a substance is exposed to light, a certain interatomic bond absorbs preferentially light of wavelength resonant with its stretching vibration and deformation vibration. Conventional polymeric materials used for plastic optical fibers are mostly compounds having C—H bonds. Such polymeric materials which basically have C—H bonds show the main absorption bands at a shorter wavelength (3400 nm) in the infrared region, since a hydrogen atom is so light as to easily vibrate. Accordingly, in the near infrared to infrared region (from 600 to 1550 nm), which is the wavelength region of a light source, relatively lower harmonic absorption peaks due to the stretching vibration of C—H bonds appears at intervals and they are greatly responsible for absorption loss.

If hydrogen atoms are substituted with fluorine atoms, these harmonic absorption peaks shift to longer wavelengths, and the amount of absorption in the near infrared region decreases. In the case of a PMMA (polymethyl methacrylate) having C—H bonds, the absorption loss attributable to the C—H bonds is estimated theoretically to be 105 dB/km at a wavelength of 650 nm and at least 10000 dB/km at a wavelength of 1300 nm.

On the contrary, in the case of a material in which hydrogen atoms are substituted with fluorine atoms, there is substantially no absorption loss at a wavelength of 650 nm, and the absorption loss at a wavelength of 1300 nm, which is between the sixth and the seventh overtones, is in the order of 1 dB/km and therefore negligible. For this reason, we propose to use a compound having C—F bonds.

It is also preferred to eliminate functional groups such as a carboxyl group and a carbonyl group which inhibit heat resistance, humidity resistance, chemical resistance and nonflammability. Further, since the presence of a carboxyl group results in absorption of near infrared light, and the presence of a carbonyl group results in absorption of ultraviolet light, it is preferred to eliminate these groups. In addition, in order to reduce a transmission loss due to light scattering, it is important to use an amorphous polymer.

In the case of a stepped-refractive-index optical fiber, multimodal light is propagated in it, by being reflected on the interface between the core and the cladding. Therefore, mode dispersion occurs, and as a result, the transmission zone decreases. However, a graded-refractive-index optical fiber hardly causes mode dispersion, and therefore, the transmission zone increases.

Further, in order to suppress formation of microvoids due to the difference in coefficient of thermal expansion during cooling of the molded product, it is important that the optical plastic material has a glass transition temperature which is substantially uniform throughout the material irrespective of the center portion or the peripheral portion of the molded product.

The present inventors have found an optical plastic material composed of an amorphous fluoropolymer which has substantially no C—H bond, especially a fluoropolymer having a cyclic structure on its main chain, and a material which differs from the polymer in refractive index, wherein the concentration of the material shows a gradient in a specific direction, and the optical plastic material has a glass transition temperature which is substantially uniform throughout it, and a method of its production, for the first time, and have arrived at the present invention having the following aspects (1) to (3).

(1) A graded-refractive-index optical plastic material composed of an amorphous fluoropolymer (a) which has substantially no C—H bond and at least one material (b) which has substantially no C—H bond and differs from the fluoropolymer (a) in refractive index by at least 0.001, wherein the material (b) is distributed in the fluoropolymer (a) so as to have a concentration gradient in a specific direction, and the optical plastic material has a glass transition temperature which is substantially uniform throughout it.

(2) A method for producing a graded-refractive-index optical plastic material composed of an amorphous fluoropolymer (a) which has substantially no C—H bond and at least one material (b) which differs in refractive index by at least 0.001 from the fluoropolymer (a), wherein the material (b) is distributed in the fluoropolymer (a) so as to have a concentration gradient in a specific direction, by a multilayer melt extrusion molding method for at least two layers, wherein the glass transition temperature of a material supplied to a nozzle center portion and the glass transition temperature of a material supplied to a peripheral portion, are adjusted to be substantially uniform to obtain an optical plastic material having a glass transition temperature which is substantially uniform throughout the optical plastic material.

(3) A method for producing a preform comprising a core and a cladding, which is useful for production of a graded-refractive-index optical fiber composed of an amorphous fluoropolymer (a) which has substantially no C—H bond and at least one material (b) which differs from the fluoropolymer (a) in refractive index by at least 0.001, wherein the glass transition temperature of a material for the portion corresponding to the core of the preform and the glass transition temperature of a material for the portion corresponding to the cladding of the preform, are adjusted to be substantially uniform to obtain a preform having a glass transition temperature which is substantially uniform throughout the preform.

Heretofore, a tetrafluoroethylene resin, a perfluoro (ethylene-propylene)resin, a perfluoroalkoxy resin, a vinylidene fluoride resin, an ethylene-tetrafluoroethylene resin, a chlorotrifluoroethylene resin and the like have been widely known as fluoropolymers. However, these fluoro resins are crystalline and cause light scattering. Accordingly, they are poor in transparency and unfavorable as materials for a plastic light transmission medium.

In contrast to these fluoro resins, amorphous fluoropolymers are free from light scattering due to crystals and therefore, are excellent in transparency. The fluoropolymer (a) of the present invention is by no means limited so long as it is an amorphous fluoropolymer having no C—H bond, however, a fluoropolymer having a cyclic structure on its main chain is preferred. As a fluoropolymer having a cyclic structure on its main chain, fluoropolymers having a fluorine-containing alicyclic structure, a fluorine-containing cyclic imide structure, a fluorine-containing triazine ring structure or a fluorine-containing aromatic ring structure are preferred. Among fluoropolymers having a fluorine-containing alicyclic structure, those having a fluorine-containing alicyclic ether structure are more preferred.

A fluoropolymer having a fluorine-containing alicyclic structure is less likely to undergo orientation of polymer molecules, when hot drawn or melt spun into fibers, as compared with fluoropolymers having a fluorine-containing cyclic imide structure, a fluorine-containing triazine ring structure or a fluorine-containing aromatic ring structure. Consequently, it does not cause light scattering, therefore is a more preferred polymer.

The viscosity of the fluoropolymer (a) in a molten state is preferred to be from $10^3$ to $10^5$ poise at a melt temperature of from 200° C. to 300° C. If the melt viscosity is too high, not only melt spinning is difficult, but also diffusion of the material (b) required for a graded refractive index, hardly takes place, and formation of a graded refractive index is difficult. On the other hand, if the melt-viscosity is too low, there are practical problems. Namely, in the case of use as a light transmission medium in an electronic equipment or an automobile, it becomes soft upon exposure to a high temperature, and the light transmission performance becomes poor.

The number-average molecular weight of the fluoropolymer (a) is preferably from 10,000 to 5,000,000, more preferably from 50,000 to 1,000,000. A too small molecular weight can interfere with heat resistance, and too a large molecular weight makes it difficult to form a graded-refractive-index light transmission medium, such being unfavorable.

As a polymer having a fluorine-containing alicyclic structure, those obtainable by polymerization of a monomer having a fluorine-containing cyclic structure, and a polymer having a fluorine-containing alicyclic structure on its main chain which is obtainable by cyclic polymerization of a fluorine-containing monomer having at least two polymerizable double bonds are preferred.

Polymers having a fluorine-containing alicyclic structure on their main chains which are obtainable by polymerization of monomers having a fluorine-containing alicyclic structure are reported by Japanese Examined Patent Publication No. 18964/1988 and the like. Namely, polymers having a fluorine-containing alicyclic structure or their main chains are obtained by homopolymerization of a monomer having a fluorine-containing alicyclic structure such as perfluoro(2, 2-dimethyl-1,3-dioxole), or by polymerization of such a monomer with a radical polymerizable monomer such as tetrafluoroethylene, chlorotrifluoroethylene and perfluoro (methyl vinyl ether).

Further, polymers having a fluorine-containing alicyclic structure on their main chains which are obtainable by cyclic polymerization of a fluorine-containing monomer having at least two polymerizable double bonds are reported by Japanese Unexamined Patent Publication No. 238111/1988, Japanese Unexamined Patent Publication No. 238115/1988 and the like. Namely, polymers having a fluorine-containing alicyclic structure on their main chains are obtained by cyclic polymerization of a monomer such as perfluoro(allyl vinyl ether) and perfluoro(butenyl vinyl ether), or copolymerization of such a monomer with a radical polymerizable monomer such as tetrafluoroethylene, chlorotrifluoroethylene and perfluoro(methyl vinyl ether).

Polymers having a fluorine-containing alicyclic structure on their main chains are also obtained by copolymerization of a monomer having a fluorine-containing alicyclic structure such as perfluoro(2,2-dimethyl-1,3-dioxole) with a fluorine-containing monomer having at least two polymerizable double bonds such as perfluoro(allyl vinyl ether) and perfluoro(butenyl vinyl ether).

As examples of the above-mentioned polymer having a fluorine-containing alicyclic structure, those having a repeating unit selected from the following formulae (I) to (IV) and, those having a repeating unit selected from the following formula (I) to (IV) and a repeating unit of the following formula (V) are mentioned. Part of the fluorine atoms in such polymers having fluorine-containing alicyclic structure may be substituted with chlorine atoms for the purpose of increase in refractive index.

[in the above formulae (I) to (V), s is from 0 to 5, t is from 0 to 4, u is from 0 to 1, s+t+u is from 1 to 6, each of p, q and r is from 0 to 5, p+q+r is from 1 to 6, R is F or $CF_3$, $R^1$ is F or $CF_3$, $R^2$ is F or $CF_3$, $X^1$ is F or Cl, $X^2$ is F or Cl and $X^3$ is F or Cl].

As the polymer having a fluorine-containing alicyclic structure, polymers having a cyclic structure on their main chains are preferred. Those containing a polymeric unit having a cyclic structure in an amount of at least 20 mol %, preferably at least 40 mol %, based on the total polymeric units, are preferred in view of transparency and mechanical properties.

The material (b) is at least one material which differs from the fluoropolymer (a) in refractive index by at least 0.001.

Further, the material (b) is a material which has substantially no C—H bond for the same reason as the fluoropolymer (a). It may have a higher refractive index or a lower refractive index than the fluoropolymer (a). In optical fibers, it is usual to use a material having a higher refractive index than the fluoropolymer (a).

The material (b) may be a low-molecular weight compound, an oligomer and a polymer. As the material (b), those containing a halogen atom such as chlorine, an aromatic ring such as a benzene ring, bromine or iodine, or a bonding group such as an ether bond are preferred. The material (b) is usually selected from materials which lower the glass transition temperature of the fluoropolymer (a). The difference in refractive index between the fluoropolymer (a) and the material (b) is preferably at least 0.005.

The material (b) preferably has a solubility parameter within $7(cal/cm^3)^{1/2}$ of that of the fluoropolymer (a). A solubility parameter is a property value which is a measure of the miscibility between materials. The solubility parameter $\delta$ is represented by the formula $\delta=(E/V)^{1/2}$, wherein E is the cohesive energy of a molecule of material, and V is the molar volume.

As a low-molecular weight compound, halogenated aromatic hydrocarbons having no hydrogen atom bonded to a carbon atom may be mentioned. Halogenated aromatic hydrocarbons containing only fluorine atoms as halogen atoms, and halogenated aromatic hydrocarbons containing a fluorine atom and another halogen atom are preferred in view of the miscibility with the fluoropolymer (a). Among such halogenated aromatic hydrocarbons, those having no functional group such as a carbonyl group or a cyano group are more preferred.

As such a halogenated aromatic hydrocarbon, a compound represented by the formula $\Phi_r$—$Z_b$ [wherein $\Phi_r$ is a b valent fluorinated aromatic ring residue having fluorine atoms substituted for all the hydrogen atoms, and Z is a halogen atom other than fluorine, —Rf, —CO—Rf, —O—Rf or —CN, wherein Rf is a perfluoroalkyl group, a polyfluoroperhaloalkyl group or a monovalent $\Phi_r$, and b is 0 or an integer of at least 1] may, for example, be mentioned. As the aromatic ring, a benzene ring or a naphthalene ring may be mentioned. The carbon number of a perfluoroalkyl group or a polyfluoroperhaloalkyl group as Rf is preferably at most 5. As a halogen atom other than fluorine, a chlorine atom and a bromine atom are preferred.

As specific compounds, for example, 1,3-dibromotetrafluorobenzene, 1,4-dibromotetrafluorobenzene, 2-bromotetrafluorobenzotrifluoride, chloropentafluorobenzene, bromopentafluorobenzene, iodopentafluorobenzene, decafluorobenzophenone, perfluoroacetophenone, perfluorobiphenyl, chloroheptafluoronaphthalene and bromoheptafluoronaphthalene may be mentioned.

The oligomeric or polymeric material (b) may be an oligomer or a polymer of such a monomer constituting the fluoropolymer (a) as described above, which differs from the fluoropolymer (a) in refractive index by at least 0.001. Such a monomer is selected from those which form a polymer which differs from the fluoropolymer (a) in refractive index by at least 0.001. For example, it is possible to use two kinds of fluoropolymers (a) having different refractive indices and distribute one polymer (a) in the other polymer (a), as the material (b).

As the oligomeric or polymeric material (b) among those having the above-mentioned repeating units (I) to (V), fluoropolymers having a different refractive index from the fluoropolymer (a) to be used in combination (for example, a combination of a fluoropolymer containing fluorine atoms only as halogen atoms with a fluoropolymer containing fluorine atoms and chlorine atoms, and a combination of two kinds of fluoropolymers obtained by polymerizing at least two monomers of different kinds in different proportions) are preferred.

Further, in addition to the above-mentioned fluoropolymers having a cyclic structure on their main chains, oligomers of monomers containing no hydrogen atom such as tetrafluoroethylene, chlorotrifluoroethylene, dichlorodifluoroethylene, hexafluoropropylene and perfluoroalkyl vinyl ether, and co-oligomers of at least two of these monomers may be used as the material (b). Further, perfluoropolyethers having a structural unit —$CF_2CF(CF_3)O$— or —$(CF_2)_nO$— (wherein n is an integer of from 1 to 3) may be used. The molecular weights of the oligomers are selected within such a range of molecular weight that they are amorphous, and are preferably from 300 to 10,000 in terms of number-average molecular weight. In view of easy diffusion, it is more preferred that the number-average molecular weights are from 300 to 5000.

The particularly preferable material (b) is a chlorotrifluoroethylene oligomer since it is excellently compatible with the fluoropolymer (a), particularly with a fluoropolymer having a cyclic structure on its main chain. By virtue of its good compatibility, it is possible to easily mix the fluoropolymer (a), particularly the fluoropolymer having a cyclic structure on its main chain with a chlorotrifluoroethylene oligomer by hot-melting them at 200 to 300° C. It is also possible to homogeneously mix them by dissolving them in a fluorine-containing solvent and then removing the solvent. The preferred molecular weight of a chlorotrifluoroethylene oligomer is from 500 to 1500 in terms of the number-average molecular weight.

In the optical plastic material of the present invention, the material (b) is distributed in the fluoropolymer (a) with a concentration gradient in a specific direction. Accordingly, depending upon the distribution, the glass transition temperature may not be substantially uniform throughout the optical plastic material. In such a case, it is possible to rectify the glass transition temperature of the optical plastic material changed by the concentration distribution of the material (b), by distributing a material (c) in the fluoropolymer (a), and it is thereby possible to make the glass transition temperature substantially uniform throughout the optical plastic material.

Figure 1:
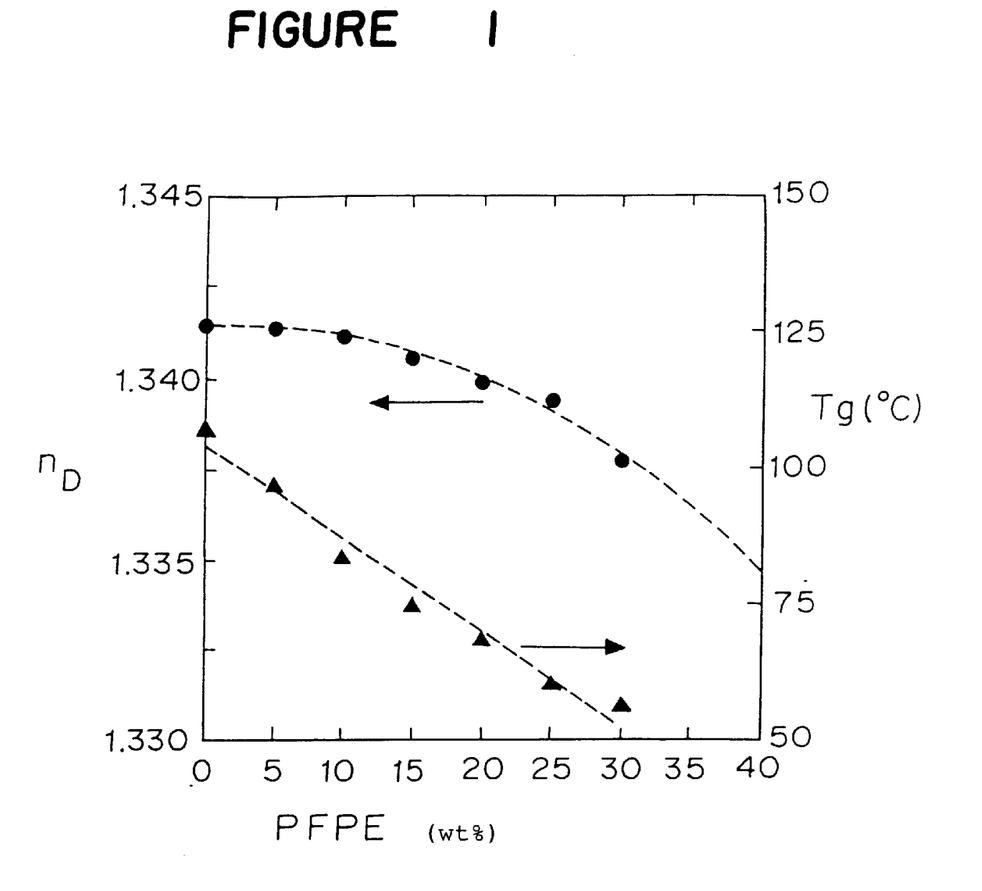
FIG. 1 is a graph showing correlations of the PFPE content in a uniform mixture of polymer A and PFPE with the refractive index and the glass transition temperature of the mixture.

The materials (b) and (c) are usually selected from materials which lower the glass transition temperature of the fluoropolymer (a). In a region where the glass transition temperature is high because the concentration of the material (b) in the fluoropolymer (a) is low, the glass transition temperature can be lowered by incorporating the material (c) so that the materials (b) and (c) are present in a mixed state. Further, in a case where there exists a region in which only the material (b) or (c) is distributed in the fluoropolymer (a), the types or concentrations of the materials (b) and (c) may be selected so that the glass transition temperature will be substantially uniform between such a region and a region where the materials (b) and (c) are present in a mixed state. FIG. 1 shows a relation in which the glass transition temperature (Tg) of a mixture of the fluoropolymer (a) and the material (c) decreases as the concentration of the material (c) in the mixture increases.

Accordingly, it is possible to make the glass transition temperature substantially uniform throughout the optical plastic material, for example, by using the materials (b) and (c) having substantially the same degree of abilities to lower the glass transition temperature of the fluoropolymer (a), so that the total concentration of the materials (b) and (c) is uniform throughout the fluoropolymer (a) when the materials (b) and (c) are distributed throughout the fluoropolymer (a). In a case where the materials (b) and (c) have abilities different in the degree of lowering the glass transition temperature of the fluoropolymer (a), it is possible to make the glass transition temperature substantially uniform throughout the optical plastic material by adjusting the degrees of the distributions of the two materials in the fluoropolymer (a).

With respect to "a mixture of the fluoropolymer (a), the material (b) and the material (c)", "a mixture of the fluoropolymer (a) and the material (b)" or "a mixture of the fluoropolymer (a) and the material (c)", such a mixture has a constant glass transition temperature when made into a uniform mixture.

In the method (2) of the present invention, the material supplied to the nozzle center portion is usually a mixture of the fluoropolymer (a) and the material (b), and the material supplied to the peripheral portion is usually the fluoropolymer (a). Likewise, in the method (3) of the present invention, the material for the portion corresponding to the core of the preform is usually a mixture of the fluoropolymer (a) and the material (b), and the material for the portion corresponding to the cladding of the preform is usually the fluoropolymer (a).

To make the glass transition temperature of the material supplied to the nozzle center portion and the glass transition temperature of the material supplied to the peripheral portion substantially uniform, it is effective to mix the material (c) compatible with the fluoropolymer (a) into the fluoropolymer (a) to be supplied to the peripheral portion. Likewise, to make the glass transition temperature of the material for the portion corresponding to the core of the preform and the glass transition temperature of the material for the portion corresponding to the cladding substantially uniform, it is effective to mix the material (c) compatible with the fluoropolymer (a) into the fluoropolymer (a) of the portion corresponding to the cladding.

A preferred example of the method (2) of the present invention is a melt extrusion molding method for a double layer structure comprising a nozzle center portion and a peripheral portion, wherein the material supplied to the nozzle center portion is a mixture of the fluoropolymer (a) and the material (b), or the material (b), and the material supplied to the nozzle peripheral portion is a uniform mixture obtained by melt mixing the fluoropolymer (a) and the material (c). In this case, it is preferred to employ a method wherein the material (b) or a mixture of the fluoropolymer (a) and the material (b) is injected to the central portion of a molten liquid of a mixture of the fluoropolymer (a) and the material (c), and molding is carried out during or after diffusing the materials (b) and (c).

In the process (2) of the present invention, the glass transition temperature of the material supplied to the nozzle center portion and the glass transition temperature of the material supplied to the nozzle peripheral portion are preliminarily adjusted to be substantially uniform in order to obtain an optical plastic material having a glass transition temperature which is substantially uniform throughout the optical plastic material.

In a case where the optical plastic material of the present invention contains the material (c), in such a state that the material (b) diffuses from the center portion of the optical plastic material towards the peripheral portion, as in the above-mentioned preferred process, the material (c) diffuses from the peripheral portion toward the center, whereby the uniform glass transition temperature throughout the optical plastic material, is maintained. Namely, if the material (b) diffuses from the central portion towards the peripheral portion, the glass transition temperature usually changes from the central portion towards the peripheral portion, but the material (c) diffuses from the peripheral portion towards the center, to compensate this change. Accordingly, in the process (2) of the present invention, if the glass transition temperature of the polymer supplied to the nozzle center portion and the glass transition temperature of the polymer supplied to the nozzle peripheral portion are preliminarily adjusted to be substantially uniform, it is possible to finally obtain an optical plastic material having a glass transition temperature which is substantially uniform throughout the optical plastic material.

The material supplied to the nozzle center portion or the material supplied to the nozzle peripheral portion may be injected not only in a single layer but also in multiple layers. The molding method may, for example, be melt extrusion molding which is suitable for forming a rod-like body material such as a preform of an optical fiber, or melt spinning molding suitable for forming an optical fiber.

In the process (3) of the present invention, it is preferred to provide at least a certain degree of a refractive index gradient to the preform. By providing at least a certain degree of a refractive index gradient to the preform, the efficiency for producing a graded-refractive-index optical fiber from the preform can be improved. Preferred examples of the method (3) of the present invention include the following methods (4) to (6).

(4) A method for producing a preform which comprises forming a hollow tube corresponding to the cladding of the preform, which is made of a uniform mixture of the fluoropolymer (a) and the material (c), utilizing a rotary tube such as a rotary glass tube, then inserting into the interior of this tube a rod corresponding to the core of the preform, which is made of the fluoropolymer (a) uniformly containing the material (b), and then heat-fusing the two for integration.

In the method (4), diffusion of the materials (b) and (c) may be permitted to take place during the heat fusion or in a subsequent wire drawing step. As the method for producing the tube corresponding to the cladding of the preform, there may be mentioned other methods such as a method wherein an aluminum tube is used as a core rod, a tube made of a uniform mixture of the fluoropolymer (a) and the material (c) is formed around the aluminum tube, and then the aluminum tube is dissolved and removed by an acid, and a method wherein a glass tube is used as a core rod and subsequently the glass tube is dissolved and removed by hydrofluoric acid. However, the method for producing such a tube is not limited to such specific examples.

(5) A method for producing a preform, wherein using, as a mold, a tube prepared in the same manner as in the above method (4) which is made of a uniform mixture of the fluoropolymer (a) and the material (c), at least one layer corresponding to the core of the preform, which is made of the fluoropolymer (a) uniformly containing the material (b), is formed on the inner wall of the mold, by rotation molding, to obtain a cylindrical or columnar molded product having at least two concentric layer structure.

In the method (3) of the present invention, the glass transition temperature of the material for the portion corresponding to the core of the preform and the glass transition temperature of the material for the portion corresponding to the cladding of the preform are preliminarily adjusted to be substantially uniform, to obtain an optical plastic material having a glass transition temperature which is substantially uniform throughout the optical plastic material.

When the optical plastic material of the present invention contains the material (c), for example, under such a condition that in the above method (4), the material (b) diffuses from the center portion of the optical plastic material towards the peripheral portion, the material (c) diffuses from the peripheral portion towards the center at the same time, whereby the uniform glass transition temperature will be maintained as the entire optical plastic material. Namely, if the material (b) diffuses from the center portion to the peripheral portion, the glass transition temperature usually changes from the center portion towards the peripheral portion, but the material (c) diffuses from the peripheral portion towards the center to complement this change. Accordingly, if in the method (3) of the present invention, the glass transition temperature of the material for the portion corresponding to the core of the preform and the glass transition temperature of the material for the portion corresponding to the cladding of the preform are preliminarily adjusted to be substantially uniform, it is possible to obtain an optical plastic material having a glass transition temperature which is substantially uniform throughout the optical plastic material.

The material (c) is preferably a material which has substantially no C—H bond for the same reason as mentioned for the fluoropolymer (a). Further, as mentioned above, the material (c) serves to rectify the glass transition temperature of the optical plastic material changed by the distribution of the material (b). The material (c) may have a higher or lower refractive index than the fluoropolymer (a). For an optical fiber or the like, it is common to employ a material having a refractive index equal to or lower than the refractive index of the fluoropolymer (a) not to impair the refractive index distribution due to the diffusion of the material (b).

The refractive index of the material (c) is selected to satisfy the following formula (1), (2), (3) or (4) in the relation with the fluoropolymer (a) and the material (b):

(1) refractive index of material (c)$\leq$refractive index of fluoropolymer (a)<refractive index of material (b)

(2) refractive index of fluoropolymer (a)$\leq$refractive index of material (c)<refractive index of material (b)

(3) refractive index of material (c)$\geq$refractive index of fluoropolymer (a)>refractive index of material (b)

(4) refractive index of fluoropolymer (a)$\geq$refractive index of material (c)>refractive index of material (b).

In an optical fiber or the like, the one satisfying the above formula (1) or (3) is preferred among the formulas (1) to (4), since the difference in the refractive index between the center portion and the peripheral portion of the fiber can be made large, and the transmission loss when the optical fiber is bent, can be suppressed.

The material (c) is preferably selected from low molecular weight compounds, oligomers and polymers as mentioned above for the material (b). Like the material (b), the material (c) preferably has a difference in the solubility parameter of at most 7 $(cal/cm^3)^{1/2}$ as compared with the fluoropolymer (a).

When the material (c) is an oligomer, the molecular weight is selected within such a range that the material will be amorphous and is preferably from 300 to 10,000 in terms of a number-average molecular weight. Such a compound is preferably diffusible under the molding condition, and in order to mix a sufficient amount uniformly to adjust the glass transition temperature, the number-average molecular weight is more preferably from 500 to 5,000 in view of the compatibility with the fluoropolymer (a).

Particularly preferred as the material (c) is a perfluoropolyether in view of e.g. good compatibility with the fluoropolymer (a), particularly with a fluoropolymer having a cyclic structure on its main chain. By the good compatibility, it is readily possible to mix the fluoropolymer (a), particularly a fluoropolymer having a cyclic structure on its main chain, and the perfluoropolyether by heat-melting at a temperature of from 200 to 300° C. Further, it is possible to uniformly mix the two by dissolving them in a fluorine-containing solvent, followed by mixing and then removing the solvent. The perfluoropolyether preferably has a number-average molecular weight of from 500 to 5,000.

The optical plastic material of the present invention is most preferably a graded-refractive-index optical fiber. In the optical fiber, the material (b) is so distributed in the fluoropolymer (a) as to have a concentration gradient in the direction of from the center to the periphery. Preferably, it is an optical fiber wherein the material (b) is a material having a higher refractive index than the fluoropolymer (a), and the material (b) is so distributed as to have such a concentration gradient that the concentration of the material (b) decreases in the direction of from the center of the optical fiber to the periphery. In some cases, an optical fiber wherein the material (b) is a material having a lower refractive index than the fluoropolymer (a), and the material (b) is so distributed as to have a concentration gradient that the concentration of the material (b) decreases in the direction of from the periphery of the optical fibers the center, is also useful. A light transmission medium such as the former optical fiber is usually produced by arranging the material (b) at the center and diffusing the material (b) toward the periphery. A light transmission medium such as the latter optical fiber is produced by diffusing the material (b) from the periphery toward the center.

In the optical plastic material of the present invention, the glass transition temperature is substantially uniform throughout the optical plastic material, whereby formation of microvoids due to the difference in coefficient of thermal expansion occurring at the time of cooling after the preparation, is prevented, and the scattering loss can be suppressed to a low level. In the present invention, the glass transition temperature being substantially uniform means that the glass transition temperature may vary to some extent so long as formation of microvoids due to the difference in coefficient of thermal expansion occurring at the time of the cooling, can be suppressed. To suppress formation of microvoids, the cooling speed is important. As the cooling speed increases, the glass transition temperature is required to be more uniform.

Further, by virtue of the plasticizing effect by the material (c), the melt viscosity at a predetermined temperature decreases as compared with a case where the fluoropolymer (a) is used alone, whereby diffusion of the material (b) is made possible at a low temperature in a short period of time, thus leading to an improvement in productivity as compared with the conventional methods, or an advantage that the heat deterioration of the material due to molding can be substantially reduced.

A light transmission medium which is the optical plastic material of the present invention has a transmission loss per 100 m of at most 1000 dB at wavelengths of from 700 to 1,600 nm. Particularly, when a fluoropolymer having an alicyclic structure on its main chain is used, it has a transmission loss per 100 m of at most 50 dB. It is quite advantageous that the transmission loss is at such a low level at relatively long wavelengths of from 700 to 1,600 nm. Namely, it has advantages that since it is available to the same wavelength as vitreous silica optical fiber, it can be connected to a vitreous silica optical fiber without any difficulties, and that a cheaper light source can be used as compared with the case of conventional plastic optical fibers which are available only to light at wavelengths shorter than from 700 to 1,600 nm.

In production of the optical plastic material of the present invention, the molding of the resins and the formation of the graded refractive index may be carried out simultaneously or separately. For example, the optical plastic material of the present invention may be so produced by spinning or extrusion molding that a graded refractive index is formed at the same time as formation of a graded refractive index. It is also possible to form a graded refractive index after molding the resins by spinning or extrusion molding. Further, it is possible to produce a preform (body material) having a graded refractive index and then form (for example spin) the preform into an optical plastic material such as an optical fiber. As described above, the optical plastic material of the present invention also means such a preform having a graded refractive index.

In the accompanying drawing.

The present invention will be described in detail with reference to Examples. However, it should be understood that the present invention is by no means restricted to such specific Examples.

SYNTHESIS EXAMPLE 1

35 g of perfluoro(butenyl vinyl ether) [PBVE], 150 g of deionized water and 90 mg of $((CH_3)_2CHOCOO)_2$ as a polymerization initiator, were put in a pressure glass autoclave of an internal volume of 200 ml. The atmosphere in the autoclave was replaced by nitrogen three times, and suspension polymerization was conducted at 40° C. for 22 hours, to obtain 28 g of a polymer having a number-average molecular weight of about $1.5 \times 10^5$ (hereinafter referred to as polymer A).

The intrinsic viscosity [η] of polymer A, measured in perfluoro(2-butyltetrahydrofuran) [PBTHF] at 30° C., was 0.50. The glass transition point of polymer A was 108° C., and it was a tough, transparent and glassy polymer. The 10% thermal decomposition temperature was 465° C., the solubility parameter was 5.3 cal/cm$^3$, and the refractive index was 1.34.

REFERENCE EXAMPLE 1

A perfluoropolyether (refractive index: 1.29, number-average molecular weight: 1,800, hereinafter referred to as PFPE) having structural units of —$CF_2CF(CF_3)O$—, —$(CF_2)O$— and —$(CF_2)_2O$— and polymer A were vacuum-sealed in a glass tube and melt-mixed at 250° C. to obtain a mixed polymer. The content of PFPE was varied from 5 to 30 wt % by every 5 wt %, whereby it was confirmed that up to 30 wt %, a uniform transparent mixed polymer can be obtained. With respect to these mixed polymers, refractive indices were measured by an Abbe refractometer, and the glass transition temperatures were measured by DSC, whereby it was found that the refractive index gradually decreases with an increase of the content, while the glass transition temperature decreases substantially linearly. FIG. 1 shows the graph of the result.

EXAMPLE 1

Polymer A was dissolved in PBTHF solvent, and then 12 wt % of 1,3-dibromotetrafluorobenzene (DBTFB), which had a refractive index of 1.52 and was different from polymer A in solubility parameter by 3.2 cal/cm$^3$, was added to obtain a mixed solution. From the solution, the solvent was removed, to obtain a transparent mixed polymer (hereinafter referred to as polymer B). The glass transition temperature of polymer B was 82° C.

Further, 12 wt % of PFPE was melt-mixed to polymer A to obtain a uniform transparent polymer (hereinafter referred to as polymer C). The glass transition temperature of this polymer C was 82° C. Polymer C was melted at 250° C., and melt-spinning was conducted at 250° C. while the melt of polymer B was injected at the center of the melt of polymer C, to obtain an optical fiber having a refractive index gradually decreasing in the direction of from the center to the periphery.

The light transmission property of the optical fiber thus obtained was 150 dB/km at 780 nm, and 180 dB/km at 1550 nm. The optical fiber was confirmed to be capable of transmit light ranging from visible light to near infrared light satisfactorily. Further, this fiber was cooled with liquid nitrogen and cut, whereupon the cut surface was inspected by a scanning electron microscope (SEM), whereby a non-uniform structure such as microvoids which cause scattering, was not observed.

EXAMPLE 2

An optical fiber was obtained in the same manner as in Example 1 except that 12 wt % of a chlorotrifluoroethylene (CTFE) oligomer having a number-average molecular weight of 800 was used instead of 12 wt % of DBTFB. The refractive index of the oligomer was 1.41, and the difference in solubility parameter between the oligomer and the polymer A was 1.4 cal/cm$^3$. The optical fiber thus obtained had such a refractive index as decreased gradually from the center to the periphery.

The light transmission property of the optical fiber was 100 dB/km at 780 nm, and 65 dB/km at 1550 nm. The optical fiber was confirmed to be capable of transmitting light ranging from visible light to near infrared light satisfactorily. Further, a polymer obtained by melt-mixing 12 wt % of the chlorotrifluoroethylene (CTFE) oligomer having a number-average molecular weight of 800 to polymer A, was a uniform transparent mixed polymer which had a glass transition temperature of 82° C.

EXAMPLE 3

Polymer A and 15 wt % of PFPE were vacuum-sealed in a glass tube and melt-mixed at 250° C. to obtain a uniform mixed polymer (hereinafter referred to as polymer D). The glass transition temperature of this polymer D was 76° C. This polymer D was melted at 250° C. and dropped into a space between first and second layers of a glass tube having a concentric double layer structure. After cooling, the outer glass tube was broken, and the center glass tube was dissolved and removed by a 50% hydrofluoric acid solution not to damage the inner wall of the hollow tube, to obtain a hollow tube of polymer D having an outer diameter of 17 mm and an inner diameter of 9 mm.

Further, polymer A and 15 wt % of the CTFE oligomer having a number-average molecular weight of 1,000 were vacuum-sealed in a glass tube and melt-mixed at 250° C. to obtain a uniform mixed polymer (hereinafter referred to as polymer E), which was formed into a rod having a diameter of 8 mm. The glass transition temperature of this polymer E was 76°.

The rod of polymer E was inserted into the hollow tube of polymer D thus obtained, and a heat shrinkable tube was put on the outer side of the hollow tube. Then, the entire assembly was vacuum-sealed in a glass tube, and the hollow tube of polymer D and the rod of polymer E were heat-fused at 200° C. to obtain a preform (hereinafter referred to as preform F). This preform F was melt-spun at 240° C. to obtain an optical fiber having a refractive index which gradually decreased from the center portion towards the peripheral portion.

The light transmission property of the optical fiber thus obtained was 100 dB/km at 780 nm and 70 dB/km at 1,550 nm, and thus was confirmed to be an optical fiber capable of transmitting light ranging from visible light to near infrared light satisfactorily.

EXAMPLE 4

90 Parts of PBVE and 10 parts of CTFE were polymerized to obtain a polymer (polymer G) having a number-average molecular weight of about $2 \times 10^5$. The glass transition temperature of polymer G was 100° C. To polymer G, PFPE having a number-average molecular weight of 1,800 was melt-mixed uniformly to obtain a mixed polymer (hereinafter referred to as polymer H) having a PFPE content of 12 wt %. The glass transition temperature of polymer H was 75° C.

This polymer H was vacuum-sealed in a glass tube and then inserted in a hollow electric furnace set horizontally, and a bearing was attached to each end and a motor was attached to one end. While rotating it at a rotational speed of 2,000 rpm horizontally, it was heated at 300° C., whereby polymer H was uniformly laminated on the inner wall of the glass tube. While rotating it, it was gradually cooled, whereupon the outer glass tube was removed to obtain a hollow tube of polymer H.

Into this hollow tube of polymer H, a rod of polymer E prepared in the same manner as in Example 3, was inserted to obtain a preform (hereinafter referred to as preform I). This preform I was melt-spun at 210° C. to obtain an optical fiber having a refractive index which decreased gradually from the center portion to the peripheral portion.

The light transmission property of the optical fiber thus obtained was 250 dB/km at 780 nm, and 80 dB/km at 1,550 nm. The optical fiber was confirmed to be capable of transmitting light ranging from visible light to near infrared light satisfactorily.

COMPARATIVE EXAMPLE 1

As for a graded-refractive-index plastic optical fiber, the light transmission loss of PMMA was about 400 dB/km at 650 nm, and the transmission losses at wavelengths of 780 nm, 1300 nm and 1550 nm were so large that it was impractical as a light transmission medium.

A stepped-refractive-index plastic optical fiber having a core and a cladding made of fluoro resins is reported to be capable of transmitting light ranging from visible light to near infrared light but has a light transmission loss of about 300 dB/km.

By contrast, the graded-refractive-index transparent fluoro resin optical fiber of the present invention is capable of transmit light ranging from visible light to near infrared light with extremely low losses.

COMPARATIVE EXAMPLE 2

In the case of a fiber prepared in the same manner as in Example 1 except that no PFPE was added, the glass transition temperature at the central portion was 82° C., while the glass transition temperature at the peripheral portion was 108° C. The light transmission property of the obtained optical fiber was 400 dB/km at 780 nm and 280 dB/km at 1,550 nm, thus bringing about an increase of the transmission loss by at least a few times as compared with the case where PFPE was added. Further, the cross-section of this fiber was inspected by a scanning electron microscope (SEM), whereby it was confirmed that many microvoids were present in the fiber.

By virtue of the application of an amorphous fluoro resin and by the suppression of formation of microvoids, the optical plastic material of the present invention can transmit light ranging from ultraviolet light to near infrared light with a quite low loss in a plastic light transmission system.

A graded-refractive-index optical fiber is particularly suitable for optical communication over short distances in spite of its large diameter since it is flexible and it is easy to form branches and junctions or it. However, no practical optical fiber with a low loss has been proposed so far. The present invention provides a practical optical fiber with a low loss for optical communication over short distances.

The light transmission medium of the present invention provides a plastic light transmission medium having heat resistance, chemical resistance, humidity resistance and nonflammability enough to withstand severe use conditions in an engine room of an automobile, an OA equipment, a plant and an electrical appliance. The graded-refractive-index optical plastic material of the present invention can be used not only as an optical fiber but also as a flat or rod lens. In such a case, by increasing or decreasing the refractive index from the center to the periphery, it can function as a convex lens or a concave lens.

What is claimed is:

1. A graded-refractive-index optical plastic material composed of an amorphous fluoropolymer (a) which has substantially no C—H bond and at least one material (b) which has substantially no C—H bond and differs from the fluoropolymer (a) in refractive index by at least 0.001, wherein the material (b) is distributed in the fluoropolymer (a) so as to have a concentration gradient in a specific direction, and the optical plastic material has a glass transition temperature which is substantially uniform throughout it.

2. The optical plastic material according to claim 1, wherein a material (c) which has substantially no C—H bond, to rectify the glass transition temperature of the optical plastic material changed by the distribution of the material (b), is distributed in the fluoropolymer (a).

3. The optical plastic material according to claim 2, wherein the material (b) and the material (c) are materials to lower the glass transition temperature of the fluoropolymer (a).

4. The optical plastic material according to claim 2, wherein the refractive index of the material (c) satisfies the following formula (1), (2), (3) or (4):

(1) refractive index of material (c)≦refractive index of fluoropolymer (a)<refractive index of material (b)
   (2) refractive index of fluoropolymer (a)≦refractive index of material (c)<refractive index of material (b)
   (3) refractive index of material (c)≧refractive index of fluoropolymer (a)>refractive index of material (b)
   (4) refractive index of fluoropolymer (a)≧refractive index of material (c)>refractive index of material (b).

5. The optical plastic material according to claim 1, wherein the fluoropolymer (a) is a fluoropolymer having a cyclic structure on its main chain.

6. The optical plastic material according to claim 1, wherein the fluoropolymer (a) has a melt viscosity of from $10^3$ to $10^5$ poise at a melt temperature of from 200 to 300° C.

7. The optical plastic material according to claim 1, wherein the material (b) differs from the fluoropolymer (a) in solubility parameter by at most $7(cal/cm^3)^{1/2}$.

8. The optical plastic material according to claim 1, wherein the material (c) differs from the fluoropolymer (a) in solubility parameter by at most $7(cal/cm^3)^{1/2}$.

9. The optical plastic material according to claim 1, which is a graded-refractive-index optical fiber or a preform of a graded-refractive-index optical fiber.

10. A method for producing a graded-refractive-index optical plastic material composed of an amorphous fluoropolymer (a) which has substantially no C—H bond and at least one material (b) which differs in refractive index by at least 0.001 from the fluoropolymer (a), wherein the material (b) is distributed in the fluoropolymer (a) so as to have a concentration gradient in a specific direction, by a multilayer melt extrusion molding method for at least two layers, wherein the glass transition temperature of a material supplied to a nozzle center portion and the glass transition temperature of a material supplied to a peripheral portion, are adjusted to be substantially uniform to obtain an optical plastic material having a glass transition temperature which is substantially uniform throughout the optical plastic material.

11. The method according to claim 10, wherein the material supplied to the nozzle center portion is a mixture of the fluoropolymer (a) and the material (b), and the material supplied to the peripheral portion is a mixture of the fluoropolymer (a) and a material (c) which has substantially no C—H bond, to rectify the glass transition temperature of the optical plastic material changed by the distribution of the material (b).

12. The method according to claim 11, wherein the material (c) diffuses into the fluoropolymer (a) of the material supplied to the nozzle center portion.

13. The method according to claim 11, wherein the optical plastic material is a graded-refractive-index optical fiber or a preform of a graded-refractive-index optical fiber.

14. The method according to claim 11, wherein the material (b) and the material (c) are materials to lower the glass transition temperature of the fluoropolymer (a).

15. The method according to claim 11, wherein the refractive index of the material (c) satisfies the following formula (1), (2), (3) or (4):

(1) refractive index of material (c)≦refractive index of fluoropolymer (a)<refractive index of material (b)
   (2) refractive index of fluoropolymer (a)≦refractive index of material (c)<refractive index of material (b)
   (3) refractive index of material (c)≧refractive index of fluoropolymer (a)>refractive index of material (b)
   (4) refractive index of fluoropolymer (a)≧refractive index of material (c)>refractive index of material (b).

16. The method according to claim 10, wherein the fluoropolymer (a) is a fluoropolymer having a cyclic structure on its main chain.

17. A method for producing a preform comprising a core and a cladding, which is useful for production of a graded-refractive-index optical fiber composed of an amorphous fluoropolymer (a) which has substantially no C—H bond and at least one material (b) which differs from the fluoropolymer (a) in refractive index by at least 0.001, wherein the glass transition temperature of a material for the portion corresponding to the core of the preform and the glass transition temperature of a material for the portion corre sponding to the cladding of the preform, are adjusted to be substantially uniform to obtain a preform having a glass transition temperature which is substantially uniform throughout the preform.

18. The method according to claim 17, wherein the material for the portion corresponding to the core is a mixture of the fluoropolymer (a) and the material (b), and the material for the portion corresponding to the cladding is a mixture of the fluoropolymer (a) and a material (c) which has substantially no C—H bond, to rectify the glass transition temperature of the preform changed by the distribution of the material (b).

19. The method according to claim 18, wherein the material (c) diffuses into the fluoropolymer (a) of the portion corresponding to the core.

20. The method according to claim 18, wherein the material (b) and the material (c) are materials to lower the glass transition temperature of the fluoropolymer (a).

21. The method according to claim 18, wherein the refractive index of the material (c) satisfies the following formula (1), (2), (3) or (4):

(1) refractive index of material (c)$\leq$refractive index of fluoropolymer (a)<refractive index of material (b)

(2) refractive index of fluoropolymer (a)$\leq$refractive index of material (c)<refractive index of material (b)

(3) refractive index of material (c)$\geq$refractive index of fluoropolymer (a)>refractive index of material (b)

(4) refractive index of fluoropolymer (a)$\geq$refractive index of material (c)>refractive index of material (b).

22. The method according to claim 18, wherein the fluoropolymer (a) is a fluoropolymer having a cyclic structure on its main chain.

* * * * *